United States Patent
Thorson et al.

(10) Patent No.: US 8,509,735 B2
(45) Date of Patent: Aug. 13, 2013

(54) METHOD AND APPARATUS TO FACILITATE DETECTION OF AN UNAUTHORIZED COMMUNICATION SYSTEM USER

(75) Inventors: Dean E. Thorson, Grayslake, IL (US); William R. Bayer, Wilmette, IL (US); Asif Z. Mehdi, Kildeer, IL (US)

(73) Assignee: Motorola Mobility LLC, Libertyville, IL (US)

( * ) Notice: Subject to any disclaimer, the term of this patent is extended or adjusted under 35 U.S.C. 154(b) by 2279 days.

(21) Appl. No.: 11/212,135

(22) Filed: Aug. 25, 2005

(65) Prior Publication Data
US 2007/0049249 A1    Mar. 1, 2007

(51) Int. Cl.
*H04M 1/66* (2006.01)
*H04B 15/00* (2006.01)

(52) U.S. Cl.
USPC .......................................... 455/410; 455/506

(58) Field of Classification Search
USPC ................................. 455/410, 411
See application file for complete search history.

(56) References Cited

U.S. PATENT DOCUMENTS

| | | | |
|---|---|---|---|
| 5,684,793 A * | 11/1997 | Kiema et al. | 370/335 |
| 6,295,446 B1 | 9/2001 | Rocha | |
| 6,466,777 B1 * | 10/2002 | Urita | 455/410 |
| 6,915,123 B1 * | 7/2005 | Daudelin et al. | 455/410 |
| 6,999,751 B2 * | 2/2006 | Thorson et al. | 455/411 |
| 7,266,364 B2 * | 9/2007 | Itoh | 455/410 |
| 7,367,497 B1 * | 5/2008 | Hill | 235/382.5 |

FOREIGN PATENT DOCUMENTS
WO    9430025    12/1994

* cited by examiner

*Primary Examiner* — Michael Faragalla

(57) ABSTRACT

A correlating receiver is used (102) at a code division multiple access base transceiver station to monitor what may comprise possible multi-path versions of a transmission from an authorized communication system user to provide monitoring results. These monitoring results are then used (103) to detect when one of the possible multi-path versions of the transmission was sourced by an unauthorized communication system user while at least another of the possible multi-path versions of the transmission was, in fact, sourced by an authorized communication system user. In a preferred approach the unauthorized communication system user is then identified (104) as being a clone.

20 Claims, 2 Drawing Sheets

METHOD AND APPARATUS TO FACILITATE DETECTION OF AN UNAUTHORIZED COMMUNICATION SYSTEM USER

TECHNICAL FIELD

This invention relates generally to the detection of unauthorized communication system users and more particularly to the detection of cloned user stations.

BACKGROUND

Communication systems of various kinds, including but not limited to wireless communication systems, are known in the art. In many such systems, some or all of the users are afforded, to a greater or lesser extent, a degree of privacy with respect to their communications. For example, both technical and legal means are often employed to seek to discourage and/or prohibit eavesdropping on the conversations of such a communication system user. Notwithstanding such efforts, however, unauthorized individuals and/or organizations continue to attempt to breach and/or evade such protective measures.

Pursuant to one approach, the unauthorized individual employs a so-called cloned station to facilitate their eavesdropping. A cloned station typically comprises a mobile station that is otherwise compatible with the protocol requirements of a given communication system and that is further programmed to present the same Electronic Serial Number (ESN) and/or Mobile Identification Number (MIN) as another target platform that comprises the eavesdropping subject of interest.

Methods and apparatus exist to aid in detecting and/or preventing the successful use of cloned stations in a given communication system. Cloned station detection, however, can comprise a challenge in at least some systems. For example, in a code division multiple access (CDMA) communication system, a base station may consider transmissions as emanate from a cloned station to be merely a multi-path component of the transmissions of a legitimate authorized user (this can occur, at least in part, because both the authorized station and the cloned station will use an identical reverse link spreading code when accessing the communication system via standard signaling messages and procedures that rely greatly on ESN and MIN values to facilitation transmission source differentiation).

Authentication and/or voice privacy techniques could of course be employed to attempt to address this situation. Unfortunately, such solutions tend to require one or more additional implementing network elements and a corresponding development of corresponding facilitating features. These approaches would therefore tend to add considerable cost to the deployment of a given communication system. Those skilled in the art will further appreciate that such approaches may present considerable challenges when retroactively deployed.

BRIEF DESCRIPTION OF THE DRAWINGS

The above needs are at least partially met through provision of the method and apparatus to facilitate detection of an unauthorized communication system user described in the following detailed description, particularly when studied in conjunction with the drawings, wherein.

Figure 1:
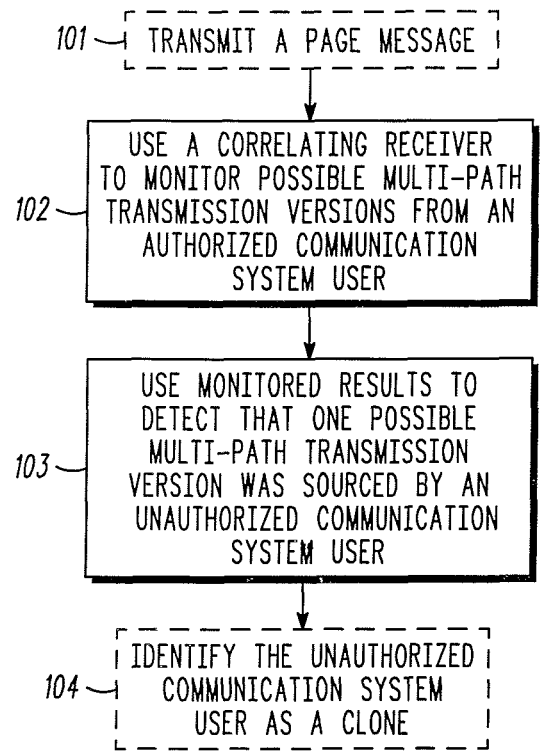
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a correlating receiver is used at a code division multiple access base transceiver station to monitor what may comprise possible multi-path versions of a transmission from an authorized communication system user to provide monitoring results. These monitoring results are then used to detect when one of the possible multi-path versions of the transmission was sourced by an unauthorized communication system user while at least another of the possible multi-path versions of the transmission was, in fact, sourced by an authorized communication system user. In a preferred approach the unauthorized communication system user is then identified as being a clone.

These teachings contemplate a variety of ways of using such monitoring results. For example, these monitoring results can be used to detect when one of the transmissions comprises a first frame type and another of the substantially simultaneously received transmissions comprises a second frame type, which second frame type is different than the first frame type. As another example, these monitoring results can be used to detect when one transmission comprises bearer content (such as, for example, voice content or bearer data content) and another transmission comprises an absence of bearer content (such as, for example, non-bearer content as system protocol signaling).

So configured, a cloned station can be reliably detected when operating in a code division multiple access communication system notwithstanding a lack of more typical authentication processing. This detection can then be employed as desired to effect a satisfactory remedy for the afflicted authorized communication system user. Those skilled in the art will understand and appreciate that these teachings are readily employed in a relatively cost effective manner and will typically not require provision of supplemental network elements. It will further be appreciated that these teachings are readily applicable in a retrofitting context and do not require, for example, reprogramming of a deployed fleet of user stations.

These and other benefits may become clearer upon making a thorough review and study of the following detailed description. Referring now to the drawings, and in particular to FIG. 1, an illustrative process 100 that accords with these teachings (via, for example, a code division multiple access base transceiver station) provides a step 102 for using a correlating receiver to monitor what may comprise possible multi-path versions of a transmission from an authorized communication system user to provide corresponding monitoring results. Such possible multi-path versions may be in response, if desired, to an optional step 101 wherein the base transceiver station transmits a page message intended and designed to elicit such a transmission from an authorized communication system user (which transmission may give rise to the possible multi-path versions noted above).

In a preferred though not required embodiment this correlating receiver comprises a rake receiver. Rake receivers are generally known in the art and comprise a radio receiver having multiple receptors using offsets of a common spreading code to receive and combine several multipath time-delayed signals. As such receivers are known in the art, and as these teachings are not particularly sensitive to the selection and use of any particular such receiver, further elaboration will not be presented here for the sake of brevity.

This process 100 then provides the step 103 of using the monitoring results to detect that one of the possible multi-path versions of the transmission was sourced by an unauthorized communication system user while at least another of the possible multi-path versions of the transmission was sourced by an authorized communication system user. This detection can be accomplished in various ways. For example, if desired, this can comprise detecting when, in a substantially simultaneous manner, the monitoring results comprise both a transmission that comprises a first frame type (such as, but not limited to, a voice frame type) and a second frame type (such as, but not limited to, an $\frac{1}{8}^{th}$ rate frame which is not ordinarily used to convey voice content), which second frame type is different than the first frame type. As another example, this can comprise detecting when, in a substantially simultaneous manner, the monitoring results comprise both a transmission that comprises bearer content (such as, but not limited to, voice traffic or bearer data traffic) and a transmission that comprises an absence of bearer content (as may be evidenced, for example, by a transmission that comprises non-bearer content such as, but not limited to, system protocol signaling).

So configured, the process can then provide the optional but preferred step 104 of identifying a detected unauthorized communication system user as being a clone. Responsive actions of choice may then be taken. For example, the present call may be cut off and subsequent calls prohibited until the authorized user's circumstances have been changed to avoid monitoring by this cloned station. As another example, a clone-detected signal can be automatically provided to alert the authorized user that their communication is likely being monitored by a cloned station. As yet another example, an alert can be provided to a system administrator to permit follow-up actions of choice.

Figure 2:
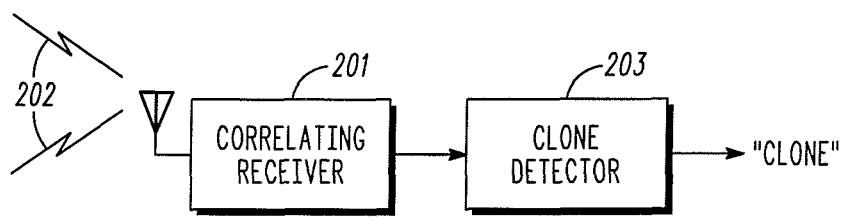
FIG. 2 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 2, an illustrative approach to such a platform will now be provided.

An apparatus 200 comprising, for example, a base transceiver site for a code division multiple access communication system, can comprise, in relevant part with respect to these teachings, a correlating receiver 201 that receives and monitors what may comprise possible multi-path versions 202 of a transmission from an authorized communication system user (not shown). This correlating receiver 201 then has a corresponding monitoring results output that operably couples to a clone detector 203.

The clone detector 203 receives the monitoring results from the correlating receiver 201 and is configured and arranged (via, for example, appropriate programming of a programmable platform and/or configuration of a dedicated purpose hardware platform) to detect when one of the possible multi-path versions 202 of the transmission was, in fact, sourced by an unauthorized communication system user while at least one other of the possible multi-path versions of the transmission was sourced by an authorized communication system user. Such detection can be effected, for example, by using one or more of the detection techniques as are set forth above.

Those skilled in the art will recognize and understand that such an apparatus 200 may be comprised of a plurality of physically distinct elements as is suggested by the illustration shown in FIG. 2. It is also possible, however, to view this illustration as comprising a logical view, in which case one or more of these elements can be enabled and realized via a shared platform. It will also be understood that such a shared platform may comprise a wholly or at least partially programmable platform as are known in the art.

Figure 3:
FIG. 3 comprises a block diagram as configured in accordance with various embodiments of the invention.
Figure 4:
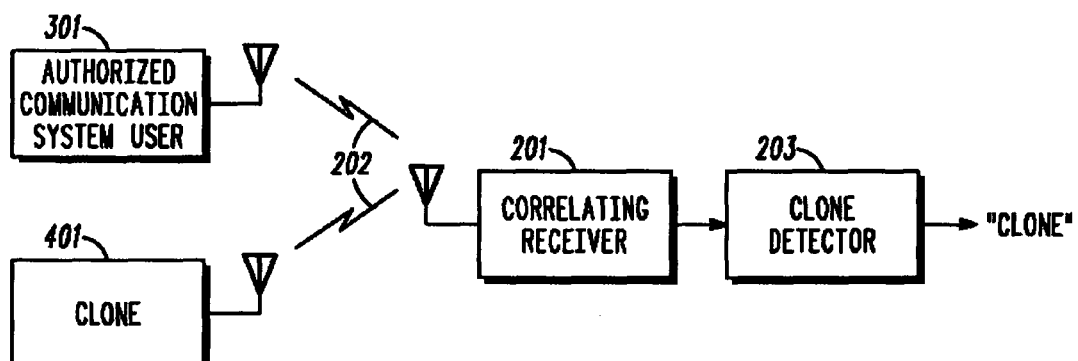
FIG. 4 comprises a block diagram as configured in accordance with various embodiments of the invention.

So configured, and referring now to FIG. 3, such an apparatus will be able to ascertain that the multi-path versions 202 as may correspond to the transmission of a single authorized communication system user 301 comprise, in fact, multi-path versions of such a transmission. Similarly, and referring now to FIG. 4, upon detecting the simultaneous presence of both an authorized communication system user 301 and at least one other communication system user 401 that is otherwise using a same identifier (or identifiers) as the authorized communication system user 301 the clone detector 203 can provide a clone-detected output for subsequent use as may be desired.

Those skilled in the art will recognize and appreciate that these teachings are readily deployed in existing communication systems without requiring undue modifications to such a system and, in particular, should ordinarily avoid the need to add additional network elements merely to support a clone-detection capability. It will also be appreciated that these teachings make no further protocol requirements and hence can be implemented without requiring changes to already-deployed mobile stations and without adding additional overhead signaling burdens.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:
1. A method comprising:
at a code division multiple access base transceiver station:
using a correlating receiver to monitor what may comprise possible multi-path versions of a transmission from an authorized communication system user to provide monitoring results;
using the monitoring results to detect that one of the possible multi-path versions of the transmission was sourced by an unauthorized communication system user while at least another of the possible multi-path versions of the transmission was sourced by an authorized communication system user.

2. The method of claim 1 wherein the correlating receiver comprises a rake receiver.

3. The method of claim 1 wherein using the monitoring results comprises detecting when, in a substantially simultaneous manner, the monitoring results comprise:
 a transmission comprising a first frame type;
 a transmission comprising a second frame type, which second frame type is different than the first frame type.

4. The method of claim 1 wherein using the monitoring results comprises detecting when, in a substantially simultaneous manner, the monitoring results comprise:
 a transmission comprising bearer content; and
 a transmission comprising an absence of bearer content.

5. The method of claim 4 wherein the bearer content comprises voice traffic.

6. The method of claim 4 wherein the transmission comprising an absence of bearer content further comprises a transmission comprising non-bearer content.

7. The method of claim 1 further comprising:
 identifying the unauthorized communication system user as a clone.

8. The method of claim 1 further comprising:
 transmitting a page message to elicit the transmission from the authorized communication system user which may give rise to the possible multi-path versions thereof.

9. An apparatus comprising:
 correlating receiver means for monitoring what may comprise possible multi-path versions of a transmission from an authorized communication system user and providing corresponding monitoring results;
 means for using the monitoring results to detect that one of the possible multi-path versions of the transmission was sourced by an unauthorized communication system user while at least another of the possible multi-path versions of the transmission was sourced by an authorized communication system user.

10. The apparatus of claim 9 wherein the apparatus comprises a code division multiple access base transceiver station.

11. The apparatus of claim 9 wherein the means for using further comprises means for detecting when, in a substantially simultaneous manner, the monitoring results comprise:
 a transmission comprising bearer content; and
 a transmission comprising an absence of bearer content.

12. The apparatus of claim 11 wherein the bearer content comprises voice traffic.

13. The apparatus of claim 11 wherein the transmission comprising an absence of bearer content further comprises a transmission comprising non-bearer content.

14. The apparatus of claim 9 wherein the means for using the monitoring results to detect that one of the possible multi-path versions of the transmission was sourced by an unauthorized communication system user while at least another of the possible multi-path versions of the transmission was sourced by an authorized communication system user further comprises means for detecting when, in a substantially simultaneous manner, the monitoring results comprise:
 a transmission comprising a first frame type;
 a transmission comprising a second frame type, which second frame type is different than the first frame type.

15. An apparatus comprising:
 a correlating receiver to monitor what may comprise possible multi-path versions of a transmission from an authorized communication system user and having a corresponding monitoring results output;
 a clone detector being operably coupled to the corresponding monitoring results output and being configured and arranged to detect that one of the possible multi-path versions of the transmission was sourced by an unauthorized communication system user while at least another of the possible multi-path versions of the transmission was sourced by an authorized communication system user.

16. The apparatus of claim 15 wherein the apparatus comprises a code division multiple access base transceiver station.

17. The apparatus of claim 15 wherein the clone detector is further configured and arranged to detect when, in a substantially simultaneous manner, the corresponding monitoring results comprise:
 a transmission comprising bearer content; and
 a transmission comprising an absence of bearer content.

18. The apparatus of claim 17 wherein the bearer content comprises voice traffic.

19. The apparatus of claim 17 wherein the transmission comprising an absence of bearer content further comprises a transmission comprising non-bearer content.

20. The apparatus of claim 15 wherein the clone detector is further configured and arranged to detect when, in a substantially simultaneous manner, the corresponding monitoring results comprise:
 a transmission comprising a first frame type;
 a transmission comprising a second frame type, which second frame type is different than the first frame type.

* * * * *